(12) United States Patent
Schiavone et al.

(10) Patent No.: US 10,197,179 B2
(45) Date of Patent: Feb. 5, 2019

(54) FLOW CONTROL ACTUATOR FOR RECIPROCATING COMPRESSORS

(71) Applicant: DOTT. ING. MARIO COZZANI S.r.l., Arcola, Province of La Spezia (IT)

(72) Inventors: Massimo Schiavone, Carrara (IT); Andrea Raggi, Lerici (IT)

(73) Assignee: DOTT. ING. MARIO COZZANI S.R.L., Arcola (IT)

( * ) Notice: Subject to any disclaimer, the term of this patent is extended or adjusted under 35 U.S.C. 154(b) by 24 days.

(21) Appl. No.: 15/548,955

(22) PCT Filed: Feb. 10, 2016

(86) PCT No.: PCT/IB2016/050706
§ 371 (c)(1),
(2) Date: Aug. 4, 2017

(87) PCT Pub. No.: WO2016/128914
PCT Pub. Date: Aug. 18, 2016

(65) Prior Publication Data
US 2018/0031138 A1 Feb. 1, 2018

(30) Foreign Application Priority Data
Feb. 11, 2015 (IT) .............. GE2015A0016

(51) Int. Cl.
*F16K 31/06* (2006.01)
*H01F 7/16* (2006.01)
(Continued)

(52) U.S. Cl.
CPC .......... *F16K 31/0679* (2013.01); *F04B 39/08* (2013.01); *F04B 39/10* (2013.01);
(Continued)

(58) Field of Classification Search
CPC .......... F04B 39/08; F04B 39/10; F04B 53/10; F04B 49/243; F16K 31/0679; H01F 7/1638; H01F 2007/1692
(Continued)

(56) References Cited

U.S. PATENT DOCUMENTS

| 6,036,120 A * | 3/2000 | Varble | F02M 51/005 239/585.1 |
| 6,763,789 B1 * | 7/2004 | Liang | F01L 9/04 123/90.11 |
| 2002/0170512 A1 * | 11/2002 | Izuo | F01L 9/04 123/90.11 |

FOREIGN PATENT DOCUMENTS

| AT | 513603 | 6/2014 |
| DE | 849739 | 9/1952 |

(Continued)

OTHER PUBLICATIONS

International Search Report for International Application No. PCT/IB2016/050706; dated Jun. 15, 2016; 4 pages.
(Continued)

*Primary Examiner* — Ian Paquette
(74) *Attorney, Agent, or Firm* — Stetina Brunda Garred and Brucker

(57) ABSTRACT

An electromechanical actuator for controlling the delivery rate of reciprocating compressors, comprising: a movable rod designed to cooperate at one end with a suction valve of a reciprocating compressor and at the other with a moving element made of a magnetizable material; at least one chamber in which said moving element is housed and onto which at least one winding of an electromagnet positioned inside a seat facing said chamber protrudes, there being positioned between said winding and said chamber at least one protective element made of a non-magnetic material and provided with static sealing elements and designed to keep
(Continued)

the winding of the electromagnet separated from the chamber in which said moving element is housed, characterized in that said protective element made of a non-magnetic material comprises at least two series of static sealing elements, a first series being positioned internally to the protective element and a second series being positioned externally to the protective element, with gas recovery holes being provided between said series of static sealing elements, and in that at least one hole for connection to a gas bleeding and washing circuit is provided in said chamber.

9 Claims, 6 Drawing Sheets

(51) Int. Cl.
*F04B 39/08* (2006.01)
*F04B 49/24* (2006.01)
*F04B 53/10* (2006.01)
*F04B 39/10* (2006.01)

(52) U.S. Cl.
CPC ............ *F04B 49/243* (2013.01); *F04B 53/10* (2013.01); *H01F 7/1638* (2013.01); *H01F 2007/1692* (2013.01)

(58) Field of Classification Search
USPC ....................................... 251/129.09, 129.16
See application file for complete search history.

(56) References Cited

FOREIGN PATENT DOCUMENTS

| | | |
|---|---|---|
| DE | 2302250 | 8/1974 |
| DE | 4401073 | 7/1995 |
| DE | 10019455 | 11/2000 |
| EP | 0361927 | 4/1990 |
| WO | WO2008000698 | 1/2008 |

OTHER PUBLICATIONS

Written Opinion of the International Searching Authority for International Application No. PCT/IB2016/050706; dated Jun. 15, 2016; 5 pages.

* cited by examiner

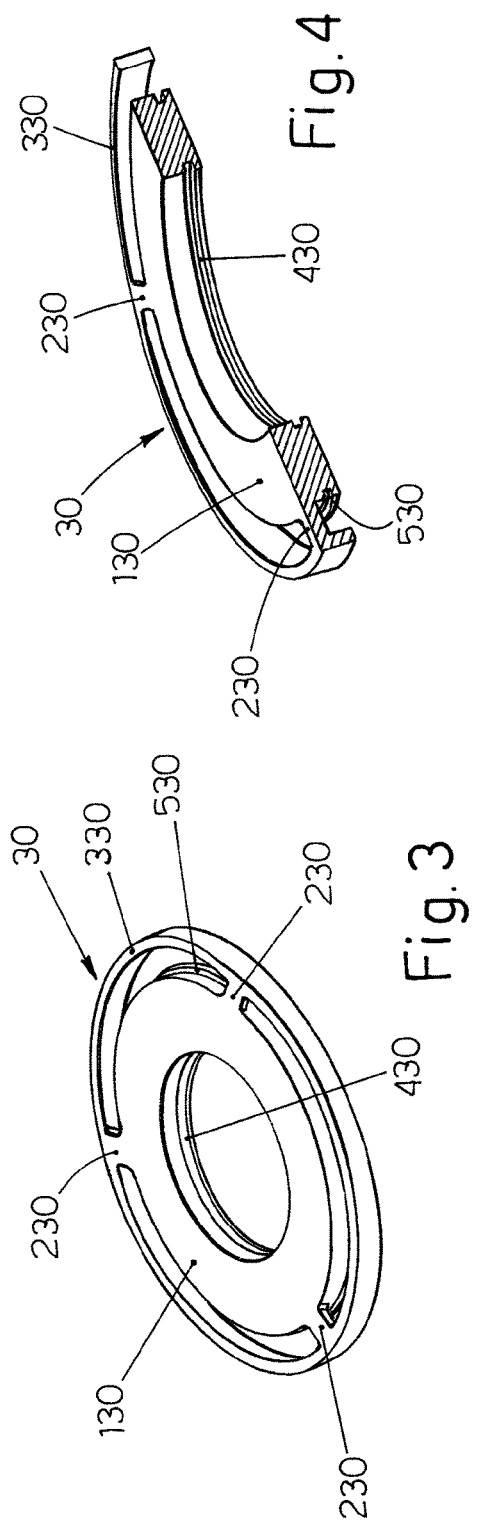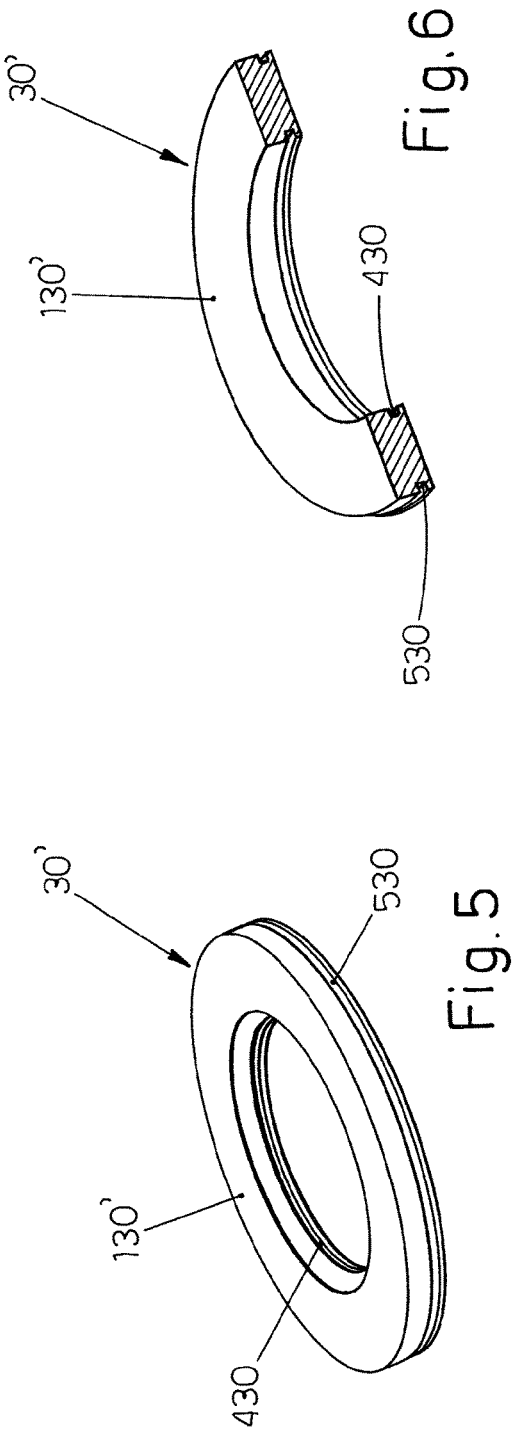

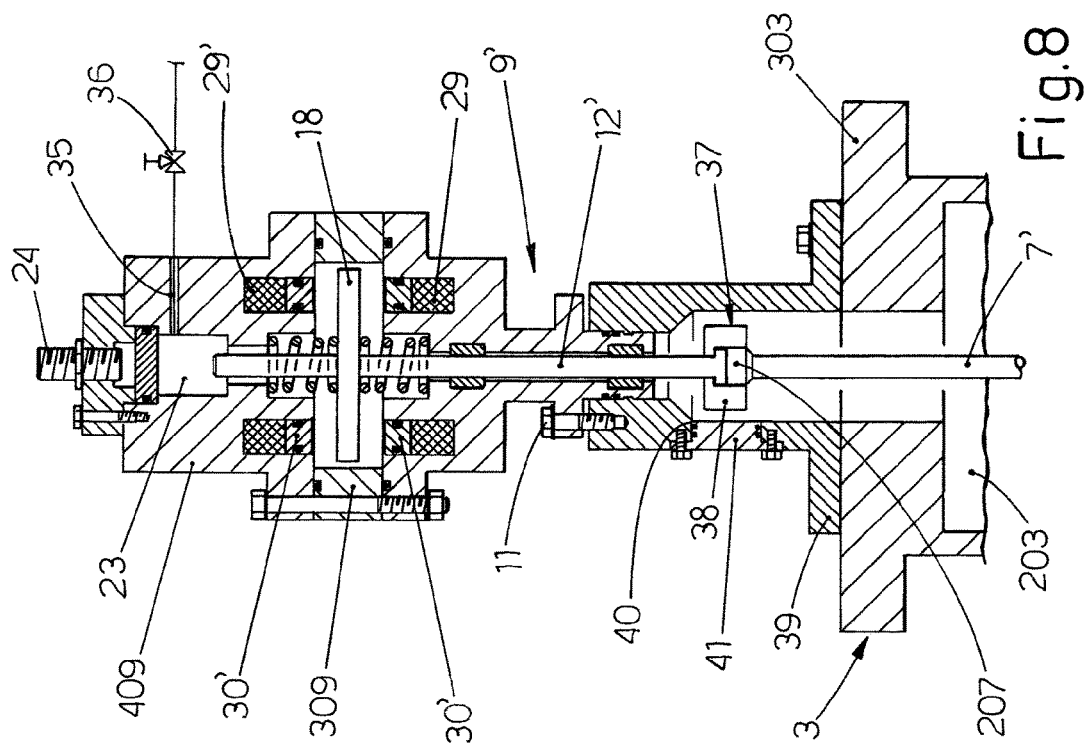
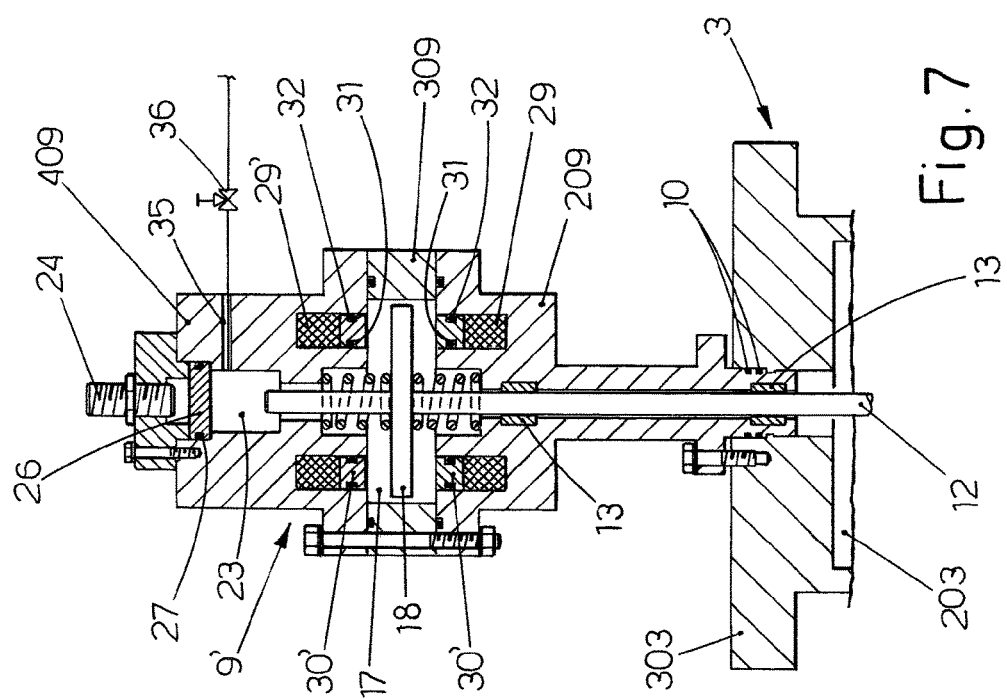

FLOW CONTROL ACTUATOR FOR RECIPROCATING COMPRESSORS

CROSS-REFERENCE TO RELATED APPLICATIONS

The present application claims priority to PCT International Application No. PCT/IB2016/050706 filed on Feb. 10, 2016, which application claims priority to Italian Patent Application No. GE2015A000016 filed Feb. 11, 2015, the entirety of the disclosures of which are expressly incorporated herein by reference.

STATEMENT RE: FEDERALLY SPONSORED RESEARCH/DEVELOPMENT

Not Applicable.

BACKGROUND

The present invention relates to reciprocating compressors, in particular to an actuator for controlling the delivery rate of reciprocating compressors and, more specifically, an electromechanical actuator for the continuous return flow control of the suction valve(s) of reciprocating compressors, i.e. an electromechanical actuator capable of controlling the suction valve on each compression cycle.

Return flow control is one of the known systems of flow control in reciprocating compressors and is implemented by delaying the closure of the suction valve(s) with respect to the point of closure in the case of maximum flow. The gas entering the cylinder of the compressor flows back in the suction line by an amount proportional to the length of the compression stroke during which the suction valve(s) are kept open.

It is wished to point out that in the following description, reference will be made to "dynamic" seals, washers or sealing elements and to "static" seals, washers or sealing elements. The term "dynamic" sealing elements means sealing elements that are subject to wear because they are positioned between two parts of which at least one is in movement, and are therefore elements subjected to friction and dynamic wear, while "static" sealing elements means sealing elements located between two fixed parts, and therefore not subject to wear resulting from movement.

In quite recent times, several different return flow control devices constituted by electromagnetic actuators and intended for reciprocating compressors have been implemented in the state of the art, these including the following patents: WO2008000698, in the name of the applicant and relating to an apparatus for the continuous regulation of reciprocating compressors; U.S. Pat. No. 7,651,069, relating to a valve comprising an electromagnetic actuator; US 2012/0260796, relating to a reciprocating compressor with delivery rate control; and WO2011009879, relating to a method for controlling the delivery rate of a reciprocating compressor and a reciprocating compressor with delivery rate control.

Normally, regulating devices of an electromagnetic type are provided with electromagnets that set in motion a moving element cooperating with a rod of the actuator, in turn cooperating with the suction valve(s) of the compressor, and must often operate at many different pressures and with many different types of gas, many of which are highly flammable, such as refinery gases.

One of the major issues to solve in these devices is to prevent compressed gas from some way coming into contact with the windings of the electromagnets or with the associated electronic devices, such as the position sensor of the moving element for example; in fact, a mixture composed, for example, of oxygen present in the air and an flammable gas, can explode if exposed to an ignition source of electrical origin.

In the current state of the art, these electromechanical actuators and, more generally, all actuators used for reciprocating compressors, whether pneumatic or hydraulic, are provided with dynamic seals positioned on the rod of the actuator; the reciprocating compressor described in document US20100086415 may be mentioned by way of example.

Unlike normal actuators used for return flow control with stepwise flow control, actuators used in return flow control capable of providing continuous flow control are subjected to extremely high activation frequencies; by way of example, it is sufficient to consider that a compressor rotating at 600 rpm, if continuously return flow controlled, would require roughly 315 million activation cycles of the actuators in a year, i.e. 315 million downward displacements of the actuator's armature and associated rod and the same number of upward displacements. Since the actuator's rod slides inside an associated seat where the annular sealing elements are located, one of the biggest problems with this type of actuator is the wear on these sealing elements, and hence the risk that compressed gas enters the chambers housing the armature and so makes contact with the windings of the actuator's electromagnets.

To reduce the risk of compressed gas returning to these chambers, precisely in the event of wear on the rod's seals, it is known to use systems of recovering gas through the rod and to use nitrogen barriers or barriers of equivalent inert gases that reduce the likelihood, but which are not found to be entirely efficient.

These sealing elements along which the actuator's rod slides can also be damaged by possible impurities or metallic particles that might be present in the compressed gas.

Furthermore, unlike pneumatic or hydraulic actuators, a gas leak in electromechanical actuators from the rod of the actuator, following possible damage to the dynamic sealing elements of the rod, implies high safety risks for the entire compressor, as, in cases of easily flammable gases such as, for example, hydrogen, ethylene and, more generally, the various hydrocarbons, the gas would enter the chambers housing the electromagnets.

As is known, to prevent possible infiltrations of compressed gas affecting the windings of the electromagnets, resin finishing processes are applied to them, but this resin finish is not sufficient to ensure there are no infiltrations of the compressed gas. It should also be considered that the possible formation of air pockets inside or beneath the resin finish and gas infiltrations jeopardise not only the actuator, but the compressor itself. In fact, it should be remembered that reciprocating compressors can operate at many different pressures, with suction pressures that can even exceed 100 bar.

BRIEF SUMMARY

One object of the present invention is therefore to provide an actuator for continuous return flow control of the delivery rate of reciprocating compressors, i.e. an actuator capable of acting on the suction valve on each compression cycle, which overcomes the drawbacks and problems of the previously mentioned known actuators and systems, and therefore an actuator that is safer, balanced, reliable, and applicable to traditional automatic suction valves of reciprocating compressors, and consequently an actuator that is extremely safe, especially if used in environments with highly flammable gases, having advantages from the pressure compensation viewpoint, i.e. an actuator that is balanced from the internal pressures viewpoint, and that is effective from the viewpoint of limiting friction between the various parts in movement.

This and other objects are achieved by this invention by means of an actuator for controlling the delivery rate of reciprocating compressors as claimed in Claim 1. Further advantageous characteristics are defined in the dependent claims.

According to a first aspect of the present invention, an electromechanical actuator for controlling the delivery rate of reciprocating compressors comprises: a movable rod designed to cooperate at one end with at least one suction valve of a reciprocating compressor and at the other with a moving element made of a magnetizable material; at least one chamber in which said moving element is housed and onto which at least one electromagnet faces; and is characterized in that the winding of this electromagnet is positioned inside a seat facing said chamber, at least one protective element made of a non-magnetic material and provided with at least one static sealing element being positioned between said winding and said chamber and able to keep the winding of the electromagnet separate from the chamber in which the moving element is positioned.

Advantageously, this electromechanical actuator for the continuous return flow control of the delivery rate of reciprocating compressors comprising at least one non-magnetic protective element of the winding(s) of the electromagnets and provided with at least one static seal is very reliable, safe, efficient from the viewpoint of the friction of the parts in movement and very balanced from the viewpoint of the pressures involved.

The use of static sealing elements, in alternative or in addition to dynamic seals placed on the rod, offers a higher level of safety, especially when easily flammable gases, such as refinery gases, are processed.

The use of said non-magnetic protective elements also allows protection of the windings of the electromagnets without affecting the magnetic field produced, as said non-magnetic elements allow the magnetic field generated by the electromagnets to close on the armature and not close on the non-magnetic elements.

Furthermore, the use of said non-magnetic elements can, in an alternative configuration of this control actuator, lead to the complete elimination of the dynamic seals. This alternative electromagnetic actuator configuration, without dynamic seals, offers further advantages to the system. Firstly, the increase in the system reliability, as one of the critical points of the system is represented by the failure of dynamic seals. In addition, the alternative configuration provides a second substantial advantage: the elimination of the dynamic seals placed on the rod allows obtaining a balanced system, as the parts in movement are immersed in the same environment, and so the pressure forces on the moving element or armature cancel each other out. Therefore, without dynamic seals, it is possible to obtain a balanced system without resorting to complex pressure compensation systems, such as that described for example in document U.S. Pat. No. 7,651,069.

Another negative aspect related to the presence of dynamic washers on the rod of the actuator is, as mentioned, linked to the friction that they generate. Therefore the presence of non-magnetic devices fitted with static seals placed to protect the windings of the electromagnets guarantees higher reliability for the entire system together with a higher safety level.

Moreover, this actuator can be provided with a further non-magnetic and non-conductive element in the area where the electric position sensor is installed, which prevents gas in the chamber below the sensor from coming into contact with the electrical part of the sensor.

At least one hole can be provided in the chamber where the sensor is located that connects this chamber to a bleed circuit. As is known, before being started, compressors that compress explosive gases are subjected to a washing cycle with nitrogen to remove air from the compressor. This washing is performed to prevent the formation of explosive mixtures. During these washing cycles, it is necessary to remove any pockets of air in the various chambers. The use of a hole connected to a bleed circuit, controlled by a valve, enables the discharge of any pockets of air from the chambers during the compressor washing operations.

The non-magnetic protective element of the winding(s) of the electromagnets will, in general, have a simple annular shape, or a protective element made of a non-magnetic material could be provided comprising a first inner ring and a second outer ring for holding it in place. These rings are preferably coaxial with each other and connected by opportune spokes.

This actuator may also comprise a mechanical device for connecting the rods of the suction valve's pusher to the rod of the actuator. The purpose of this device is to increase the reliability of the system, in particular, to avoid possible wear generated in the contact area between the two rods and avoid resorting to complex play compensation systems. In a preferred configuration, the suction valve is inserted in the housing in the cylinder of the compressor and locked in its position by the valve cover. Then, the flanged body in which the electromechanical actuator is inserted is connected onto the valve cover. The screwing on of the mechanical device to make the two rods integral with one another is then performed by means of opportune covers present on flanged body and opportune tools.

BRIEF DESCRIPTION OF THE DRAWINGS

Further characteristics and advantages of the present invention shall be better understood in the course of the following description, provided by way of non-limitative example and referring to the accompanying drawings, in which:

FIG. 3 shows a perspective view of one of the non-magnetic elements used in the actuator di FIG. 1 and FIG. 2;

FIG. 4 shows a perspective, cross-sectional view of the non-magnetic element in FIG. 3;

FIG. 5 shows a perspective view of an embodiment variant of a non-magnetic protective element;

FIG. 6 shows a perspective and cross-sectional view of the non-magnetic element di FIG. 5;

FIG. 7 shows a second embodiment of this actuator comprising the embodiment variant of the non-magnetic protective elements shown in FIGS. 4 and 5;

FIG. 8 shows a further sectional view of the actuator in FIG. 7 in which the associated rod is connected by mean of a mechanical device to the rod of the pusher of the suction valve of a reciprocating compressor;

DETAILED DESCRIPTION

Figure 1:
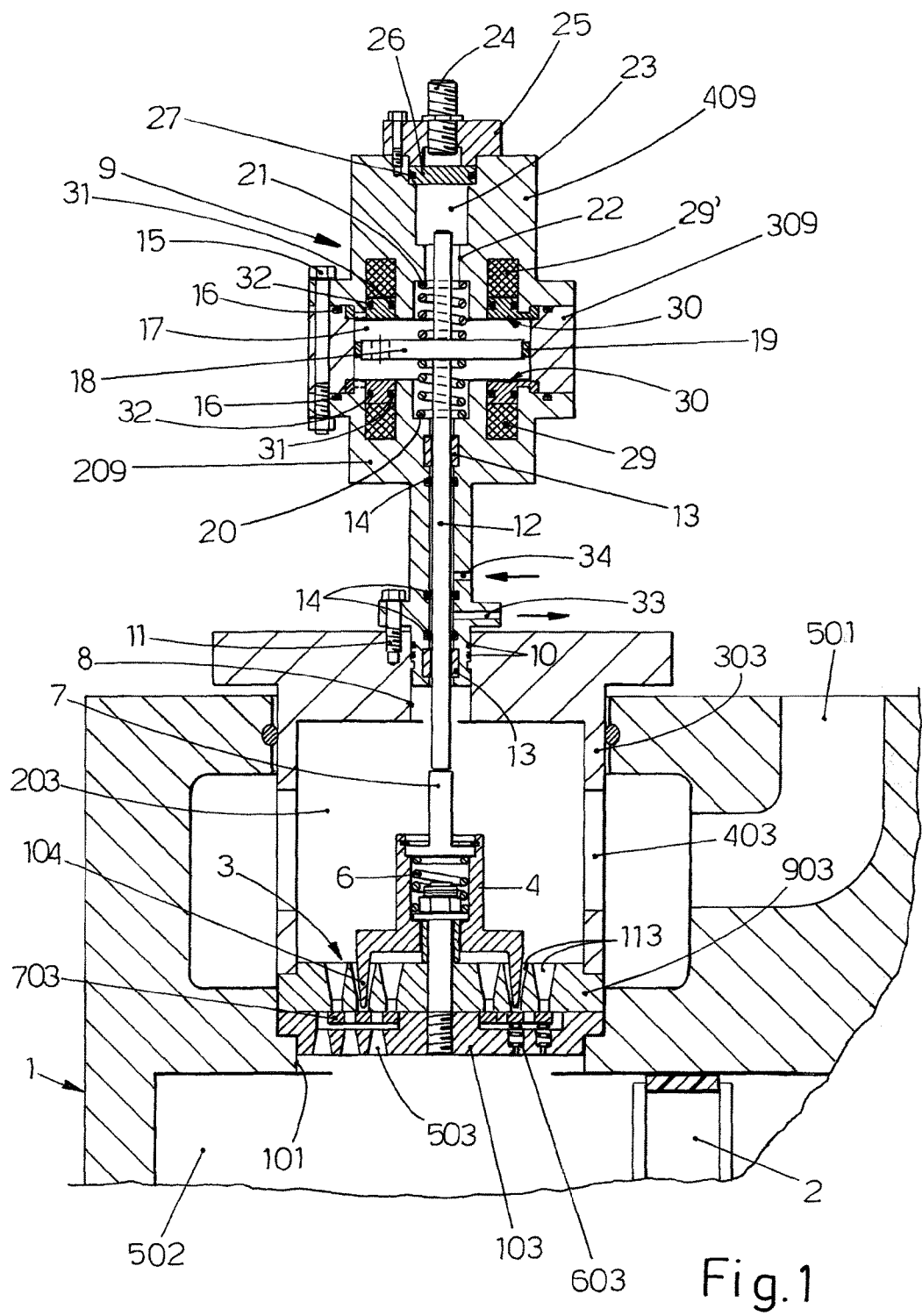
FIG. 1 shows a sectional view of a first embodiment of an electromechanical actuator for controlling the delivery rate of reciprocating compressors according to the present invention equipped with opposing electromagnets and of a first embodiment of non-magnetic protective elements.
Figure 2:
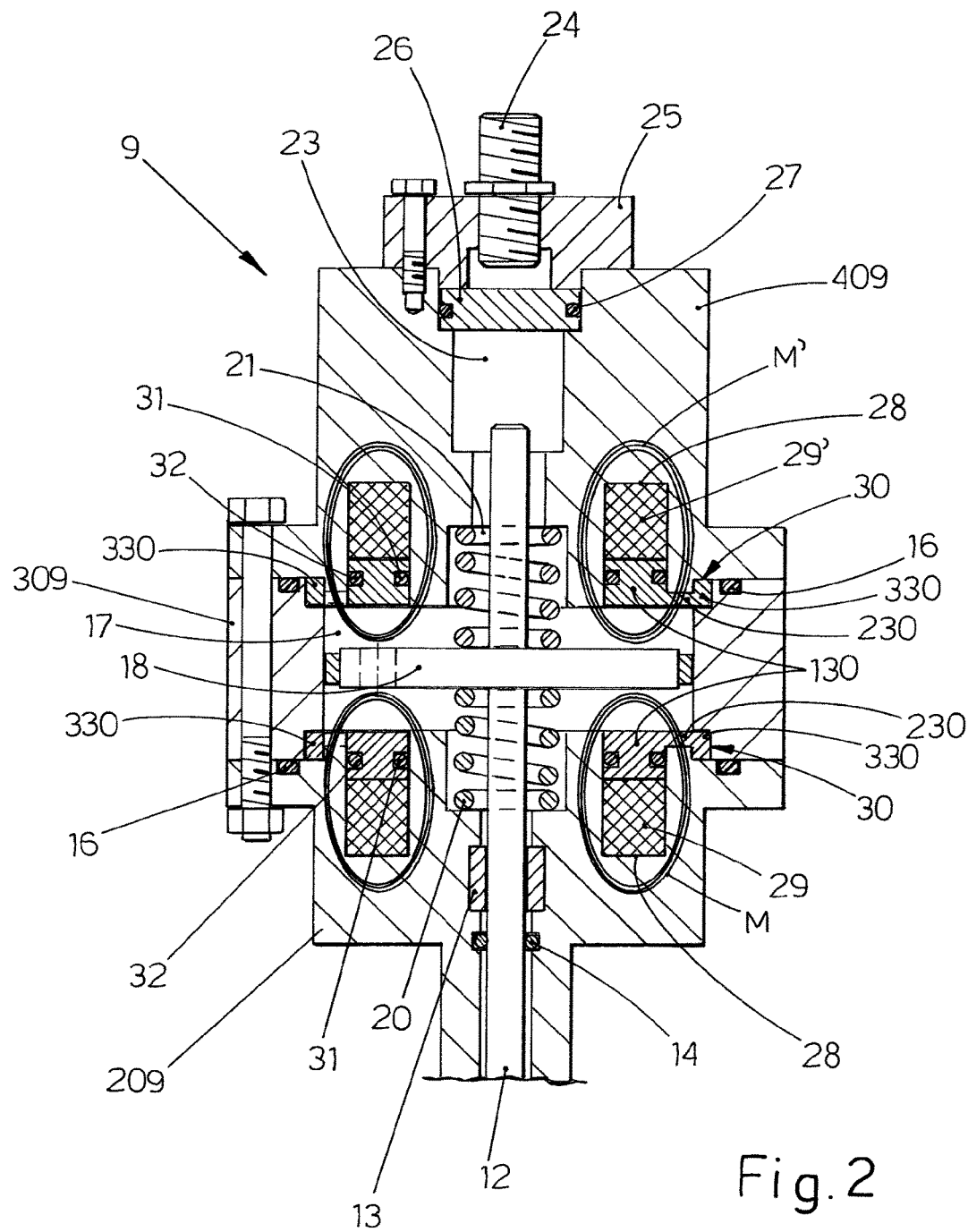
FIG. 2 shows a view of the electromechanical actuator in FIG. 1 on a larger scale.

With reference to the accompanying drawings and with particular reference to FIGS. 1 and 2 thereof, reference numeral 1 indicates the cylinder of a (partially shown) reciprocating compressor, a cylinder that can be a single or double acting and within which a piston 2 slides. There is an opening 101 on a wall of the cylinder for housing the suction valve 3. The suction chamber 203 places the suction line 501 in communication with the chamber 502, in which compression of the fluid takes place. The valve 3 is locked in the cylinder 1 by means of the covers 303. The suction valve 3 is mainly composed of the following components: a seat 903, provided with ducts 113 for passage of the gas, a counter-seat 103, this also provided with ducts 503 for passage of the gas, elastic loading means 603, at least one sealing element 703, and a pusher 4, sliding axially with respect to the opening 101, with the purpose of acting on the obturator 703 through the legs 104 to force the valve 3 into an open position. On the part of the cover 303 opposite to that facing the cylinder chamber 502 there is an axial hole 8 in which an electromechanical actuator 9 is inserted and fastened to the cover 303 by pins 11. The rod 12 of the actuator 9 can slide axially inside the body 209 of the actuator and is guided by guide elements 13. The lower end of the rod 12 of the actuator 9 abuts against the upper end of the rod 7 of the pusher 4. Sealing elements 14 are provided inside the body 209 of the actuator that are housed in opportune seats made inside said body 209 and which are, essentially, the so-called dynamic sealing elements, as they must ensure the seal with a rod 12 that moves with a translational motion in contact with them. The actuator 9 is substantially composed of said lower body 209, a central body 309 and an upper body 409, which are fastened to each other in a removable manner by opportune pins 15. Sealing elements 16 are positioned between the central body 309 and the upper and lower bodies 209 and 409 of the actuator, in this case so-called static sealing elements, as there are no members or other elements that move in contact with them. Inside the actuator 9 there is a chamber 17 in which a moving element 18 made of a magnetizable material can slide, possibly by means of a guide element 19 in contact with the walls of the chamber 17. This moving element or armature 18 is integral with the rod 12 of the actuator and is in contact on both sides with a pair of springs 20 and 21 that tend to keep it in a central position in the chamber 17, as shown in the figure. Spring 20 is positioned around the rod 12 of the actuator and on one end is in contact with the bottom of an opportune seat made in the lower body 209 of the actuator and on the other is in contact with lower part of the armature 18. Spring 21 is also positioned around the rod 12, aligned with spring 20 and in contact at one end with the upper part of the armature 18 and at the other with the bottom of a seat made in the upper body 409 of the actuator. The rod 12 of the actuator protrudes from a hole 22 in the upper body 409 inside an upper chamber 23, inside of which a position sensor 24 is provided, this being connected to a non-magnetic support element 25 preferably placed on the top of the upper body 409 of the actuator 9. This sensor 24 detects the position of the rod 12 and therefore of the armature 18 that is integral therewith, and effectively controls the closed position of the suction valve 3. An element 26 made of a non-magnetic material is provided to protect the sensor 24 and is fitted with a sealing element 27 to prevent any gas present in the chamber 23 from entering into contact with the electrical part with which the sensor 24 is equipped. An annular seat 28 facing the chamber 17 is provided in the lower body 209 of the actuator. This seat 28 houses the winding 29 of an electromagnet and an annular protective element 30 made of a non-magnetic material, which is interposed between the winding 29 and the chamber 17, and so ultimately between the winding 29 of the electromagnet and the moving armature 18. An annular seat 28' is also provided in the upper body 409 of the actuator for housing the winding 29' of an electromagnet and another annular element 30' made of a non-magnetic material for the purpose of protecting the winding 29'. Both of the non-magnetic annular elements 30 are provided with at least one inner sealing element 31 and at least one outer sealing element 32, in this case, advantageously with static sealing elements. The two windings 29 and 29' oppose each other in the axial direction. As can be easily inferred by observing FIGS. 1 and 2, these annular elements 30 made of a non-magnetic material can be inserted between the central body 309 and the upper 409 and lower bodies 209 of the actuator 9 during their assembly and connection. Furthermore, since the actuator 9 can be formed by these separable bodies 209, 309 and 409, these non-magnetic sealing elements 30 are easily replaceable, if necessary. The use of said non-magnetic elements 30 enables protection of the windings 29 and 29' of the electromagnets without affecting the magnetic field produced by them; in fact, referring to FIG. 2, said non-magnetic elements 30 allow the magnetic field M or M' generated by winding 29 or 29' of the electromagnet to close on the armature 18 and not on the non-magnetic element 30. Another advantage related to the addition of non-magnetic elements 30 provided with static sealing elements 31 and 32 is that excellent sealing of the actuator 9 is also guaranteed in the event of possible stress and failure of the dynamic sealing elements 14 on which the rod 12 slides following wear and which could compromise the safety of the electromechanical actuator. Safety of the actuator is particularly important in the presence of highly flammable compressed gases, such as hydrogen, ethylene, refinery gases, etc., and so the presence of non-magnetic annular elements 30 fitted with static sealing elements 31 and 32, consequently seals not subjected to dynamic wear, prevents gas from entering into contact with the windings 29 and 29' of the electromagnets. To further limit the possibility that gas present in the suction chamber 203 could arrive to the chamber 17 in which the armature 18 moves, a first radial hole 33 for recovering gas and a second radial hole 34 for feeding nitrogen barrier gas are provided on the body 209, (refer to FIG. 1).

FIGS. 3 and 4 of the accompanying drawings show one of the two annular elements 30 made of a non-magnetic material and described with reference to FIGS. 1 and 2. The annular element 30 is formed by a first inner ring 130 of larger breadth that is connected to a second peripheral ring 330 of smaller breadth and is connected to the latter by spokes 230. The inner ring 130 and the outer ring 330 are coaxial. The spokes 230 connecting the inner ring 130 to the outer ring 330 are preferably of equal length and evenly spaced apart from each other. In the inner ring 130 there is a first inner annular seat 430 for housing the sealing element 31 in FIG. 2 and a second outer annular seat 530 for housing the sealing element 32 in FIG. 2. The purpose of the outer annular element 330 is to firmly keep the inner ring 130 in position when the annular sealing element 30 is positioned between the bodies of the actuator in FIG. 2, hence between the upper body 409 and the central body 309 or between the central body 309 and the lower body 209.

FIGS. 5 and 6 show a simplified variant of the annular element 30' made of a non-magnetic material: basically, in this variant, the sealing element comprises a single ring 130' provided with an internal sealing element inside the annular housing seat 430 and an external sealing element outside of the annular housing seat 530.

FIG. 7 shows a variant of this electromechanical actuator 9' in which the non-magnetic annular elements 30' in FIG. 5 and FIG. 6 are used. Elements already described with reference to the preceding figures have the same reference numerals. As these non-magnetic sealing elements 30' are provided with inner and outer sealing elements 31 and 32, it is possible to provide for the rod 12 of the actuator 9' to move inside the lower body 209 without the aid of the sealing elements 14 subject to dynamic wear shown in FIG. 1. In addition, hole 35 can be made in one of the walls of the upper chamber 23 for connection to a circuit for bleeding and washing with nitrogen, and controlled by a valve 36. As is known, before they are started, compressors are subjected to a washing cycle with nitrogen to remove air from the compressor. This washing is performed to prevent the formation of explosive mixtures. During these washing cycles, it is necessary to remove any air pockets in the various chambers. Utilization of hole 35 connected to a bleed circuit, controlled by valve 36, enables discharging any air pockets from chambers 23, 17 and 203 during the compressor washing operations. A further advantage deriving from the configuration shown in FIG. 7, a configuration in which dynamic seals 14 are absent, is related to imbalances in the armature 18 deriving from pressure forces acting on the rod 12. By way of example, if a rod 12 with a diameter of 20 mm and a gas pressure of 60 bar in the suction chamber 203 are considered, if dynamic seals 14 are present on the rod 12, as in FIG. 1, there would be an upthrust on the armature 18 (side opposite to the valve 3) of approximately 1848 N. Therefore, the presence of dynamic seals 14 on the rod could generate an imbalance in the armature 18, especially in the actuator configuration with opposing electromagnets, as in FIG. 1. To reduce the negative effects resulting from imbalance in the armature 18 in known regulation systems, it is necessary to resort to more or less complex pressure compensation systems, the majority of which are ill-suited to working conditions with variable compressed gas pressures, conditions usually necessary in processes in which reciprocating compressors are called to operate. Instead, with this actuator, these dynamic seals can even be removed due to the use of static sealing elements 31 and 32, as this configuration of the actuator, where the pressure in the chambers 23, 17 and 203 is the same, ensures the armature 18 has a perfectly balanced position unaffected by the pressure in the cylinder chamber.

FIG. 8 shows an electromechanical actuator 9', as shown in FIG. 7 for example, which is equipped with a mechanical device 37 for connection to the translation rod 7' of the pusher 4 in FIG. 1. In this configuration, the rod 7' is provided with a threaded tip 207 that is screwed into a nut 38 fitted on the rod 12' of the actuator 9'. Basically, the suction valve 3 is housed on the wall of the compressor at opening 101 by means of the cover 303, as in FIG. 1, and then the flanged and hollow body 39 in which the rod 12 of the actuator is inserted is fastened to this cover 303. At this point, the actuator 9', equipped with as associated flange, is fastened on the top of the flanged body 39 by pins 11. This flanged body 39 is provided at the side with an access opening 40 which is sealed shut by means of a cover 41. By removing this cover 41, it is possible to tighten the nut 38 on the threaded tip 207 of the rod 7' of the pusher using an appropriate tool. Utilization of the mechanical device 37 serves to keep the two rods together, eliminating the problem of wear that can be generated on two separate rods (12 and 7) and avoiding the use of complex play compensation systems as described in patent US2012/0260796

Figure 9:
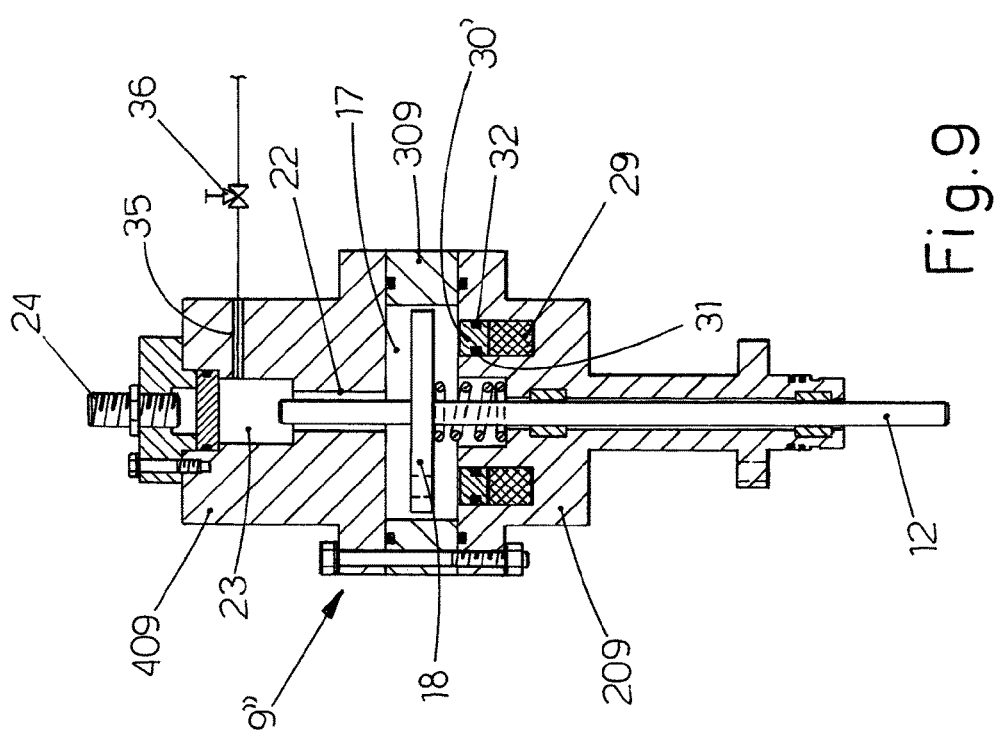
FIG. 9 shows a sectional view of a further variant of this actuator, in which a single electromagnet is provided.

FIG. 9 shows another variant of the electromechanical actuator 9", in which the use of just a single electromagnetic winding 29 is contemplated and therefore only one non-magnetic annular protection element 30', provided with an associated outer sealing element 32 and inner sealing element 31. In this case, the upper body 409 of the actuator will be provided with the through hole 22 at the centre for the upper part of the rod 12 and will have a flat shape facing the chamber 17 in which the armature 18 moves.

Figure 10:
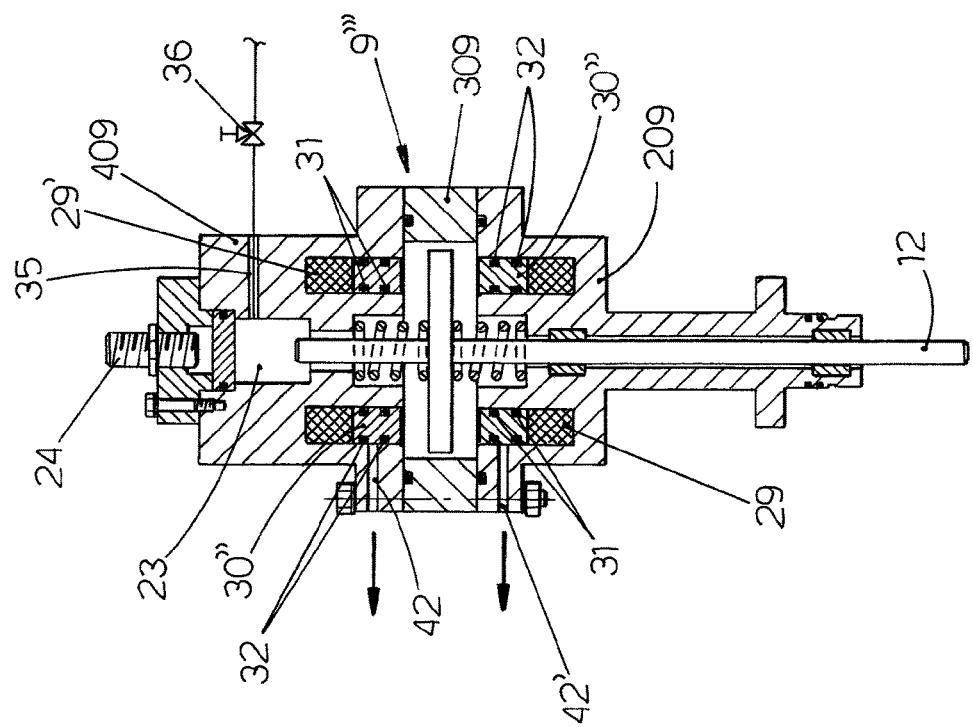
FIG. 10 shows a sectional view of yet a further variant of this actuator, in which gas recovery holes are provided in positions corresponding to the non-magnetic protective elements.

FIG. 10 shows a further variant of the electromechanical actuator 9''' according to the invention. The electromechanical actuator 9''' is equipped with two opposing windings 29 and 29' and non-magnetic annular elements 30'', which are however provided with two series of inner sealing elements 31 and two outer sealing elements 32. A first gas recovery hole 42 is provided in the box-shaped body 409 at a height between the first series of sealing elements and the second series of sealing elements and, similarly, a second gas recovery hole 42' is provided in the lower body 209 of the actuator between the first series of sealing elements and the second series of sealing elements. The presence of gas recovery holes 42 and 42' arranged between the first series of sealing elements 31 and 32 and the second series of sealing elements 31 and 32 further increases the safety levels of the electromechanical actuator when it is used with a compressor for highly explosive gases.

Figure 11:
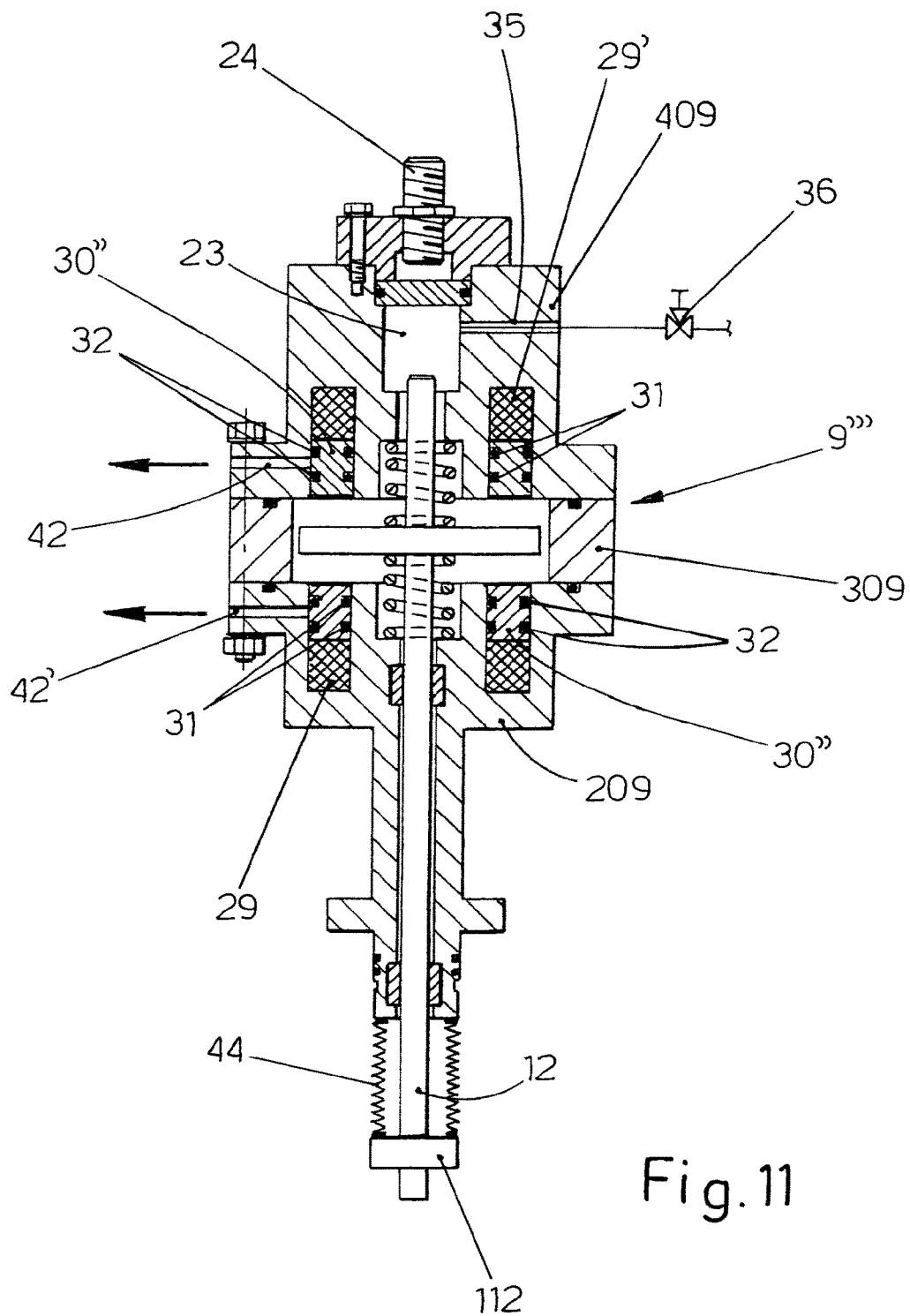
FIG. 11 shows a sectional view of the actuator in which the use of bellows is contemplated, with one end integral with the lower body of the actuator and the other end integral with the rod of the actuator.

FIG. 11 shows a further variant of the electromechanical actuator 9'''' according to the invention. The electromechanical actuator 9'''' is equipped with bellows 44 integral on one end with the body of the actuator 209 and on the other with a lobe 112 made on the rod 12.

As can be seen from the foregoing description, there are various advantageously usable embodiments and variants for this electromechanical actuator and, naturally, these embodiments and variants can be combined with one another in various ways.

In general, from the functional standpoint, this electromagnetic actuator 9, 9', 9'', 9''', preferably operates on the suction valve 3 in a unidirectional manner, i.e. by the action of rod 12 or 12' combined with the action of rod 7 or 7' of the pusher 4, this electromechanical actuator having the ability to keep the suction valve open on each compression cycle, so as to control the delivery flow generated by the compressor to the requirements of the plant. Unlike known electromechanical actuators, this actuator has the object of implementing continuous return flow control of the delivery rate in a much safer, more balanced and more reliable manner.

Therefore, according to the variants or combinations of the variants shown, this electromechanical actuator for controlling the delivery rate of reciprocating compressors is advantageous from the safety viewpoint, as systems for controlling the delivery rate of reciprocating compressors are often needed in refineries, where highly flammable gases are processed. Moreover, considering that the actuators are subject to pressure, vibration and high temperatures, deterioration of the electrical insulation is sufficient to generate a spark, i.e. an ignition source to ignite the gas. The use of non-magnetic protective elements provided with opportune static sealing elements, and therefore not subject to dynamic deterioration, significantly increases the safety level of the actuators. At the same time, the non-magnetic material with which the protective element is made allows the windings of the electromagnets with which the actuator is provided to properly and efficiently perform their function; in fact, the magnetic field continues to close on the armature.

This electromechanical actuator has undoubted advantages from the pressure compensation viewpoint. The rod 12 or 12' of the actuator is subjected to thrust by the gas on one end, i.e. the end in contact with the suction valve 3. This gas thrust, especially in actuators with opposing electromagnets, produces an imbalance in the central position of the armature. If necessary, the use of non-magnetic protective elements 30, 30', 30" allows the elimination of all the sealing elements subjected to dynamic wear, as shown in FIG. 7, with the result of being able to bring the gas inside the actuator, ultimately defining a system subjected to the same pressure, i.e. obtaining a compensated system.

This electromechanical actuator has also been found to be extremely reliable. In fact, sealing elements that are not subject to dynamic wear, and hence so-called static sealing elements, are preferably used. By way of example, it is sufficient to consider that a compressor rotating at 600 rpm, if continuously return flow controlled, would require roughly 315 million activation cycles of the actuators in a year, i.e. 315 million downward displacements of the actuator's armature and associated rod and the same number of upward displacements. It is clear that the use of static sealing elements, and therefore not subject to dynamic wear cycles, offers consistent reliability advantages.

As a consequence of the foregoing, this electromechanical actuator is found to be advantageous from the viewpoint of the considerable limitation of friction between parts in movement. By their nature, sealing elements subject to dynamic wear produce frictional forces. The more dynamic washers are used, the more frictional forces are generated on the rod. Moreover, the higher the pressures, the higher the frictional forces. It is obvious that in order to guarantee optimal performance, regulation systems must be capable of acting rapidly. The absence, or at least the limitation, of so-called dynamic washers or sealing elements therefore enables reducing the frictional forces, making the actuator still further perfected and efficient.

The invention claimed is:

1. An electromechanical actuator for controlling the delivery rate of reciprocating compressors, comprising:

a movable rod configured to cooperate at one end with a suction valve of a reciprocating compressor and at the other end with a moving element made of a magnetizable material;

at least one chamber in which the moving element is housed and onto which at least one winding of an electromagnet positioned inside a seat facing the chamber protrudes; and at least one protective element made of a non-magnetic material provided with static sealing elements, the protective element being positioned between the winding and the chamber, the protective element being operative to keep the winding of the electromagnet separated from the chamber;

wherein the protective element comprises at least two series of static sealing elements, a first series of static sealing elements being positioned internally to the protective element and a second series of static sealing elements being positioned externally to the protective element, with gas recovery holes being provided between the series of static sealing elements; and wherein at least one hole for connection to a gas bleeding and washing circuit is provided in the chamber.

2. The electromechanical actuator according to claim 1, wherein the protective element made of a non-magnetic material has an annular shape.

3. The electromechanical actuator according to claim 1, wherein the electromechanically actuator comprises two opposing electromagnetic windings positioned at the sides of the chamber, each of the windings being provided with an associated protective element made of a non-magnetic material.

4. The electromechanical actuator according to claim 1, wherein the protective element made of a non-magnetic material comprises a first inner ring and a second outer ring, the first inner ring and the second outer ring being connected by spokes.

5. The electromechanical actuator according to claim 1, wherein the electromechanical actuator does not include any dynamic sealing elements.

6. The electromechanical actuator according to claim 1, wherein the movable rod is configured to cooperate at one end with a suction valve via connection to a translation rod of a pusher of the suction valve.

7. The electromechanical actuator according to claim 1, further comprising a sensor for detecting the position of the moving element.

8. The electromechanical actuator according to claim 1, further comprising a body through which the movable rod travels, the body comprising a first radial hole for gas recovery and a second radial hole for feeding an inert barrier fluid.

9. The electromechanical actuator according to claim 8, further comprising bellows, the bellows being integral at one end with the body through which the movable rod travels and integral at the other end with the movable rod.

* * * * *